US012234120B2

(12) United States Patent
Manes et al.

(10) Patent No.: US 12,234,120 B2
(45) Date of Patent: Feb. 25, 2025

(54) ENERGY-AWARE DISPATCHING FOR CONVEYANCE SYSTEMS

(71) Applicant: Otis Elevator Company, Farmington, CT (US)

(72) Inventors: Enrico Manes, Feeding Hills, MA (US); Suman Dwari, Vernon, CT (US); Stephen Savulak, Woodbury, CT (US); Ronnie E. Thebeau, Haddam, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1483 days.

(21) Appl. No.: 16/702,985

(22) Filed: Dec. 4, 2019

(65) Prior Publication Data

US 2020/0189875 A1 Jun. 18, 2020

Related U.S. Application Data

(60) Provisional application No. 62/779,500, filed on Dec. 14, 2018.

(51) Int. Cl.
*B66B 1/30* (2006.01)
*B66B 1/24* (2006.01)

(52) U.S. Cl.
CPC ............ *B66B 1/302* (2013.01); *B66B 1/2458* (2013.01); *B66B 2201/216* (2013.01)

(58) Field of Classification Search
CPC . B66B 1/302; B66B 1/2458; B66B 2201/216; B66B 1/2408; B66B 11/04; H02J 7/0068; H02J 50/00
See application file for complete search history.

(56) References Cited

U.S. PATENT DOCUMENTS

| | | | | |
|---|---|---|---|---|
| 7,032,715 | B2 | 4/2006 | Smith et al. | |
| 8,083,033 | B2 * | 12/2011 | Kallioniemi | B66B 1/302 187/290 |
| 8,172,042 | B2 | 5/2012 | Wesson et al. | |
| 8,616,338 | B2 | 12/2013 | Veronesi | |
| 8,887,872 | B2 | 11/2014 | Chen et al. | |
| 9,016,440 | B2 | 4/2015 | Finschi et al. | |

(Continued)

FOREIGN PATENT DOCUMENTS

| | | | | |
|---|---|---|---|---|
| CN | 102339017 | B | 4/2013 | |
| EP | 3534493 | A1 * | 9/2019 | B60L 53/12 |

(Continued)

OTHER PUBLICATIONS

EP Application No. 19216261.8 Extended EP Search Report dated May 28, 2020, 8 pages.

(Continued)

*Primary Examiner* — Jeffrey Donels
(74) *Attorney, Agent, or Firm* — CANTOR COLBURN LLP

(57) ABSTRACT

An aspect includes a system with an energy storage device configured to provide electrical power to a conveyance apparatus of a conveyance system, a power management system configured to determine a charging schedule to recharge the energy storage device based at least in part on a status of the conveyance system, and a dispatching system configured to modify a dispatch schedule of the conveyance system based at least in part on the charging schedule.

20 Claims, 5 Drawing Sheets

(56) References Cited

U.S. PATENT DOCUMENTS

| | | | | |
|---|---|---|---|---|
| 9,546,072 | B2 | 1/2017 | Sonnenmoser | |
| 2003/0034209 | A1 | 2/2003 | Tang et al. | |
| 2003/0089557 | A1 | 5/2003 | Eilinger | |
| 2009/0218175 | A1 * | 9/2009 | Wesson | B66B 1/302 187/289 |
| 2010/0020705 | A1 | 1/2010 | Umeda | |
| 2017/0210596 | A1 | 7/2017 | Mezzadri et al. | |
| 2018/0127236 | A1 * | 5/2018 | Piech | B66B 9/00 |
| 2018/0186595 | A1 | 7/2018 | Krishnamurthy et al. | |
| 2018/0194592 | A1 | 7/2018 | Darling et al. | |
| 2018/0251338 | A1 | 9/2018 | Ratia et al. | |

FOREIGN PATENT DOCUMENTS

| | | | |
|---|---|---|---|
| JP | S59117486 | A | 7/1984 |
| WO | 2007145628 | A1 | 12/2007 |
| WO | 2010020705 | A1 | 2/2010 |

OTHER PUBLICATIONS

CN Application No. 201911278460 Second OA dated Sep. 7, 2021, 14 pages.

* cited by examiner

ENERGY-AWARE DISPATCHING FOR CONVEYANCE SYSTEMS

CROSS-REFERENCE TO RELATED APPLICATION

This application claims the benefit of priority to U.S. Provisional Application No. 62/779,500 filed Dec. 14, 2018, the disclosure of which is incorporated herein by reference in its entirety.

BACKGROUND

The embodiments herein relate to the field of conveyance systems, and specifically to a method and apparatus for energy-aware dispatching for conveyance systems.

Conveyance systems, such as, for example, elevator systems, escalator systems, and moving walkways require electric power for operation. Travelling cables typically connect an elevator car of the elevator system to a stationary power source to provide power to the elevator car.

BRIEF SUMMARY

According to an embodiment, a system is provided. The system includes an energy storage device configured to provide electrical power to a conveyance apparatus of a conveyance system, a power management system configured to determine a charging schedule to recharge the energy storage device based at least in part on a status of the conveyance system, and a dispatching system configured to modify a dispatch schedule of the conveyance system based at least in part on the charging schedule.

In addition to one or more of the features described herein, or as an alternative, further embodiments may include where modification of the dispatch schedule adjusts one or more of: a charging time of the energy storage device, an arrival time of the conveyance apparatus, and a departure time of the conveyance apparatus.

In addition to one or more of the features described herein, or as an alternative, further embodiments may include where modification of the dispatch schedule is based on at least one of: a state of charge of the energy storage device, a state of health of the energy storage device, a temperature of the energy storage device, a current dispatching plan of the conveyance apparatus, a location of the conveyance apparatus, and a location of a recharging interface.

In addition to one or more of the features described herein, or as an alternative, further embodiments may include where the charging schedule is adjusted to change a charging duty cycle of the energy storage device with respect to one or more other energy storage devices.

In addition to one or more of the features described herein, or as an alternative, further embodiments may include where the charging schedule and the dispatch schedule are adjusted with respect to one or more expected usage patterns of a plurality of conveyance apparatuses including the one or more other energy storage devices.

In addition to one or more of the features described herein, or as an alternative, further embodiments may include where the power management system is configured to wirelessly transmit electrical power to the energy storage device at one or more locations.

In addition to one or more of the features described herein, or as an alternative, further embodiments may include where the conveyance system is an elevator system, and the conveyance apparatus is an elevator car.

In addition to one or more of the features described herein, or as an alternative, further embodiments may include where the energy storage device is a battery system.

In addition to one or more of the features described herein, or as an alternative, further embodiments may include where the energy storage device includes one or more of: fuel cells, flow batteries, capacitors, and/or potential energy storage devices.

In addition to one or more of the features described herein, or as an alternative, further embodiments may include where the electrical power is provided to one or more of lights, heating, air conditioning, displays, panels, door motors, communication systems, sensor systems, and/or safety systems of the conveyance apparatus.

A method includes monitoring, by a power management system, an energy storage device of a conveyance apparatus of a conveyance system. The method includes determining, by the power management system, a charging schedule to recharge the energy storage device based at least in part on a status of the conveyance system. The method further includes modifying a dispatch schedule of the conveyance system based at least in part on the charging schedule.

Technical effects of embodiments of the present disclosure include controlling conveyance system dispatching based on one or more conditions of at least one energy storage device of the conveyance system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
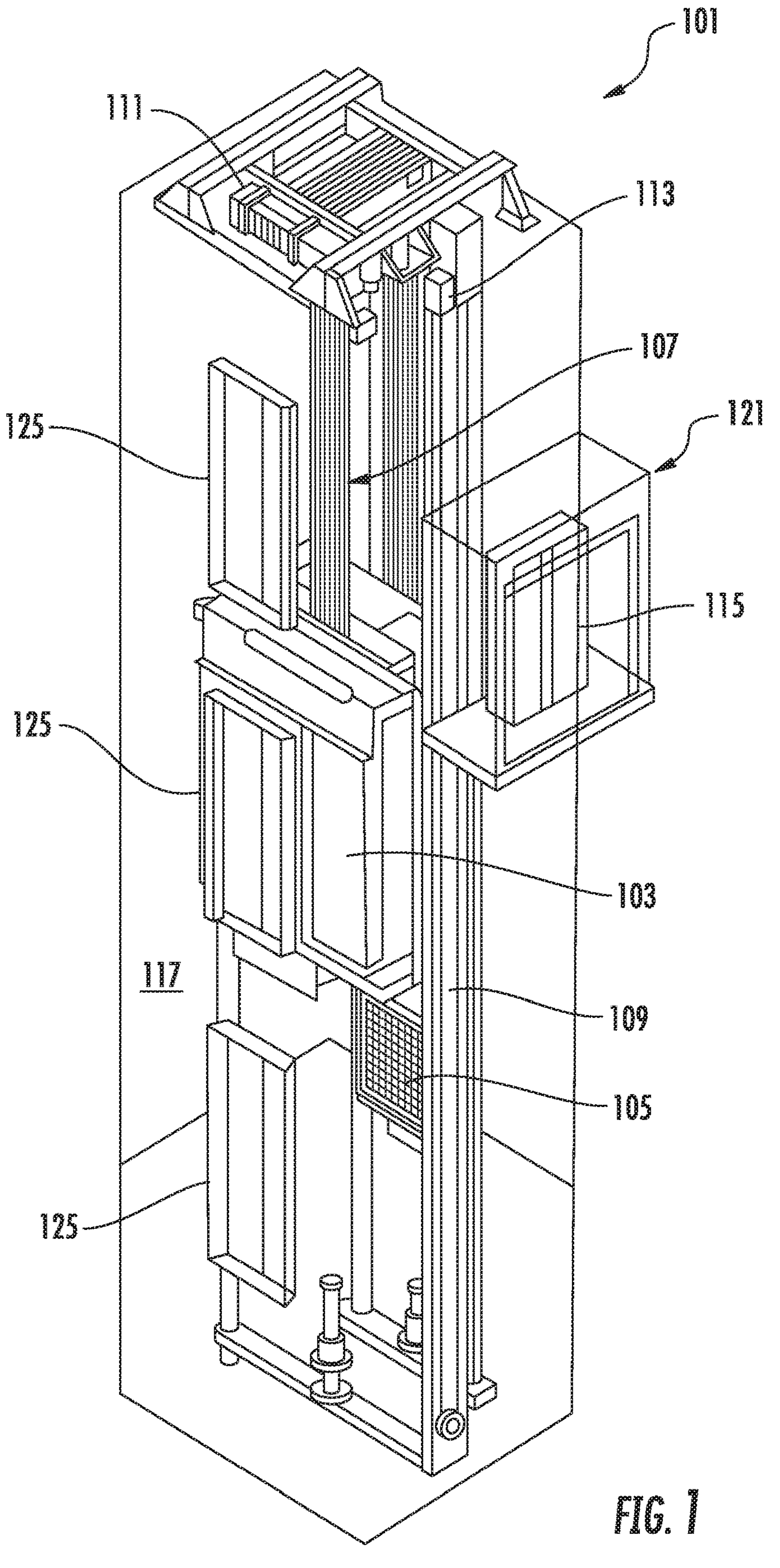
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes. Further, embodiments can include more than one car in the same hoistway and/or where cars can move between hoistways.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system. Thus, the elevator system 101 can also be referred to as conveyance system 101, and the elevator car 103 can also be referred to as conveyance apparatus 103.

Figure 2:
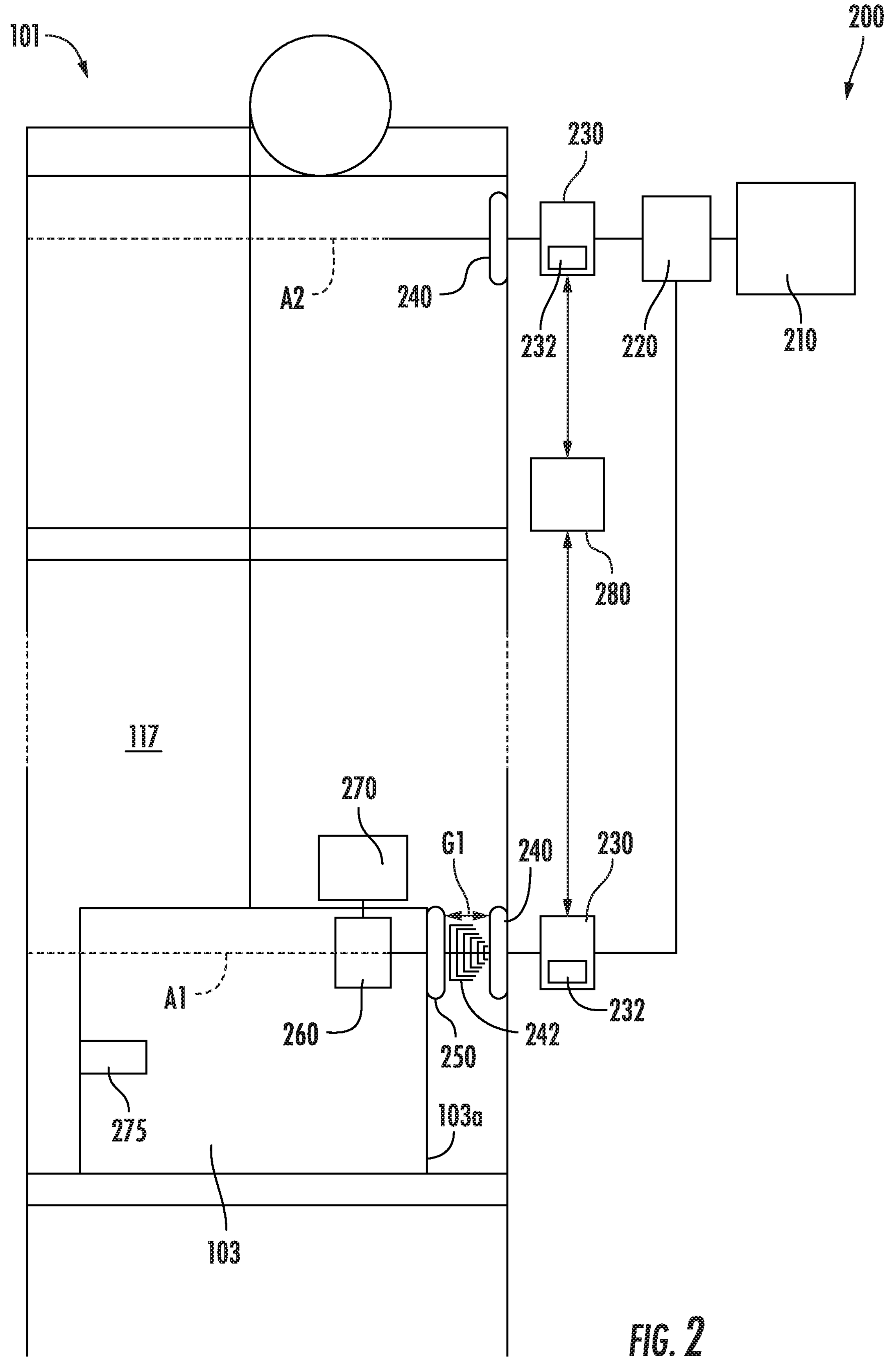
FIG. 2 is a schematic illustration of a power transfer system for the elevator system of FIG. 1, in accordance with an embodiment of the disclosure.
Figure 3:
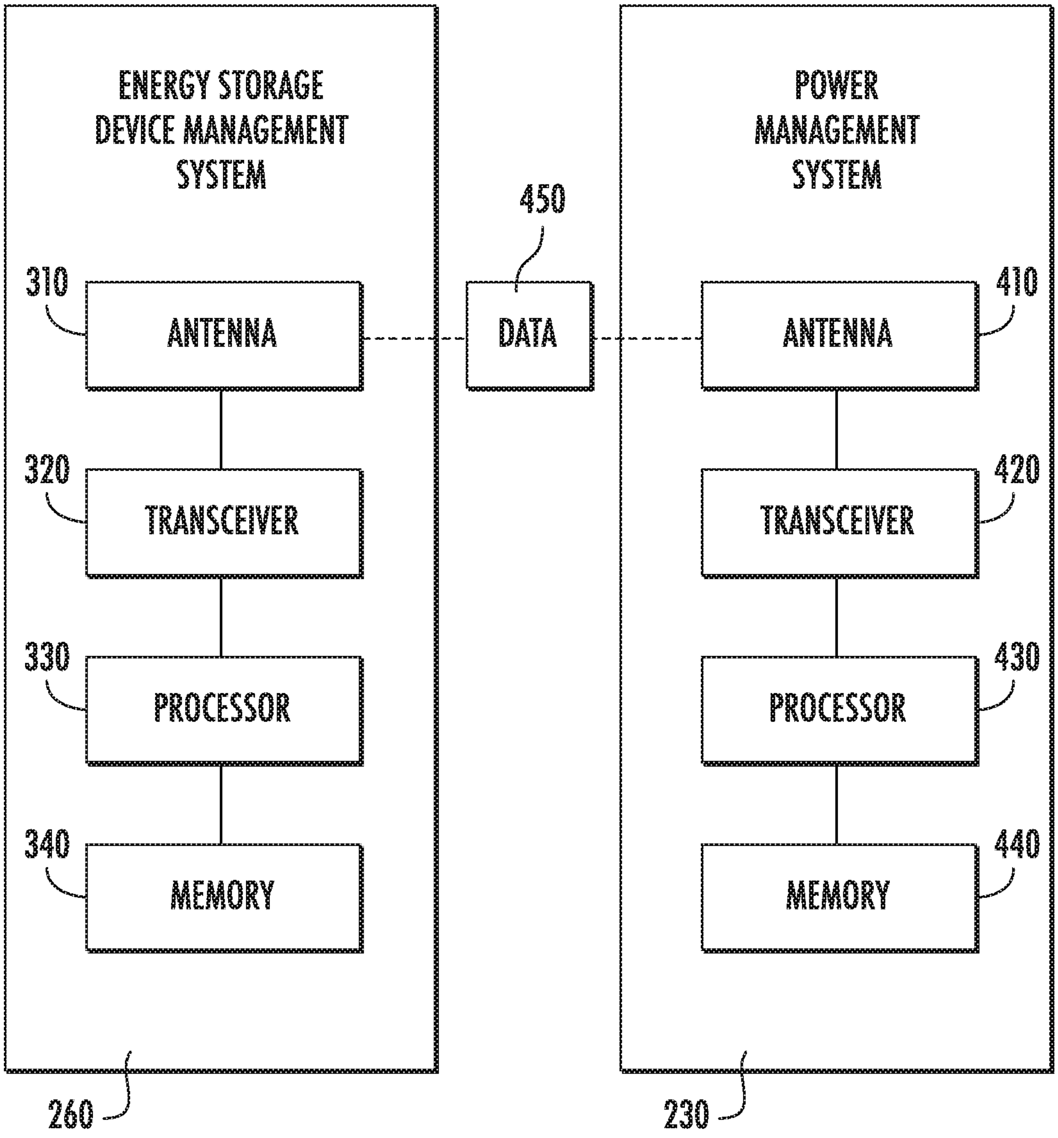
FIG. 3 is an enlarged view of communication within the power transfer system of FIG. 2, in accordance with an embodiment of the disclosure.

Referring now to FIGS. 2-3 with continued reference to FIG. 1, a view of a system 200 for use with the elevator system 101 of FIG. 1 is illustrated, in accordance with an embodiment of the present disclosure as an example of a wireless power transfer system. It should be appreciated that, although particular systems are separately defined in the schematic block diagrams, each or any of the systems may be otherwise combined or separated via hardware and/or software. The system 200 may include a power source 210, a power converter 220, a power management system 230, an electrical power transmitter 240, an electrical power receiver 250, an energy storage device management system 260, an energy storage device 270, and a dispatching system 280.

The power source 210 may be a stationary power source, such as an electrical grid, wind, solar, generator power, and/or other such source known in the art. The power source 210 may provide electrical power that can be further conditioned by power converter 220 for the power management system 230 and/or other electric loads.

The power management system 230 is electrically connected to the power converter 220 and may be hardwired. The power management system 230 operates as a power controller to supply the power needs of the elevator car 103 proximate one or more locations, such as a first location A1 and a second location A2. The power management system 230 can control switching, directing, or redirecting power to the elevator car 103 through one or more electrical power transmitters 240 as needed to satisfy the power requirements of the elevator car 103. Electrical power may be transmitted wirelessly or using one or more physical connections. Switching, directing, and redirecting may readily be accomplished employing a bus control switching device 232 of the power management system 230. The bus control switching device 232 may include, but not be limited to, electromechanical and solid-state semiconductor switching devices including relays, contactors, solid state contactors as well as semiconductor switching devices such as transistors, FETs, MOSFETS, IGBTs, thyristors, SCRs, and the like. In addition, to facilitate and implement the functionality of the power management system 230, the voltages and frequencies of the power supplied by the power source 210 may be adjusted by the bus control switching device 232. For example, the bus control switching device 232 may modify a frequency or duty cycle of the power provided from the power converter 220 to satisfy the needs of the elevator car 103.

The system 200 may include one or more electrical power transmitters 240, as shown in FIG. 2. The electrical power transmitters 240 are electrically connected to the power management system 230. The electrical connection between the electrical power transmitter 240 and the power management system 230 may be hardwired. The electrical power transmitter 240 may be located at different locations along the elevator shaft 117. In the example shown in FIG. 2, electrical power transmitters 240 can be positioned at separate locations, such as at a first location A1 in the elevator shaft 117 and a second location A2 of the elevator shaft 117. The electrical power transmitter 240 may be attached to or embedded in a component of the elevator shaft 117. As an example, the electrical power transmitter 240 may include a selected number of electrical coils configured to generate an electromagnetic field 242 when electrical power is run through the electrical coils. The electrical coils of the electrical power transmitter 240 are not shown in FIG. 2 for simplification of the illustration. Alternatively, the electrical power transmitter 240 can use one or more physical contactors to make an electrical connection with the electrical power receiver 250. Further, other known power transmission techniques between the electrical power transmitter 240 and the electrical power receiver 250 may be used.

The system 200 may include one or more electrical power receivers 250, as shown in FIG. 2. The electrical power receivers 250 may be located at different locations of the elevator car 103, such as at a surface 103*a* or recessed into surface 103*a*. For example, the electrical power receivers 250 may be attached to the elevator car 103 or embedded in the elevator car 103. When the elevator car 103 and the electrical power receivers 250 are located at the first location A1, the electrical power receivers 250 and the electrical power transmitter 240 at the first location A1 are substantially proximate and a gap G1 can be formed therebetween. Alternatively, the electrical power transmitter 240 and at least one of the electrical power receivers 250 may make physical contact at location A1 such that the gap G1 is absent. Likewise, when the elevator car 103 and the electrical power receivers 250 are located at the second location A2, the electrical power receivers 250 and the electrical power transmitter 240 at the second location A2 can be substantially proximate and gap G1 can be formed therebetween. Further, the electrical power transmitter 240 and at least one of the electrical power receivers 250 may make physical contact at location A2 such that the gap G1 is absent.

The electrical power receivers 250 may include a selected number of electrical coils configured to generate an electric power in response to the electromagnetic field 242 when the electrical power receiver 250 is within the transmission range of the electromagnetic field 242 generated by the electrical power transmitter 240. The electrical coils of the electrical power receiver 250 are not shown in FIG. 2 for simplification of the illustration. Electrical power transmission can include any variation known in the art of contact-based or contactless power transmission, including physical contact, magnetic coupling, optical power transfer, and/or other wireless power transfer techniques.

The electrical power receivers 250 can be electrically connected to the energy storage device management system 260. The electrical connection between the electrical power receiver 250 and the energy storage device management system 260 may be hardwired. The energy storage device management system 260 is configured to condition the electrical power received from the electrical power receivers 250 and transfer the electrical power to the energy storage device 270 as needed. The energy storage device management system 260 can also monitor data 450 (see FIG. 3) of the energy storage device 270 and the elevator car 103 which may include at least one of the state of charge of the energy storage device 270, a state of health of the energy storage device 270, a temperature of the energy storage device 270, a dispatching of the elevator car 103, a location of the elevator car 103, and a location of a recharging interface such as one or more electrical power transmitters 240. Examples of the energy storage device 270 may include a battery system (e.g., a battery or bank of batteries), fuel cells, flow battery, capacitors (e.g., super/ultra-capacitors), and other devices capable of storing and outputting electric energy. In one embodiment, the energy storage device 270 may store potential energy rather than electrical energy and that potential energy may be utilized to create electrical energy for the elevator car 103. The energy storage device 270 may include a battery system, which may employ multiple batteries organized into battery banks. The energy storage device 270 is electrically connected to the elevator car 103. The electrical connection between the energy storage device 270 and the elevator car 103 may be hardwired. The energy storage device 270 can provide electrical power to one or more electrical loads 275 of the elevator car 103, such as lights, heating, air conditioning, displays, panels, door motors, communication systems, sensor systems, and/or safety systems.

The dispatching system 280 can interface with power management system 230 to control dispatching of the elevator car 103 with respect to a charging schedule to recharge the energy storage device 270 based at least in part on a status of the elevator system 101. The dispatching system 280 may also use power management system 230 to exchange data with energy storage device management system 260, such as status information and a current dispatching plan of the elevator car 103. The dispatching system 280 may modify the dispatch schedule of the elevator car 103 based at least in part on the charging schedule, for instance, to ensure sufficient time is provided for charging of the energy storage device 270 at one or more of the locations A1, A2. Further, in determining when to dispatch the elevator car 103 to a particular landing 125 (FIG. 1), the dispatching system 280 can determine an amount of electrical energy likely needed for the one or more electrical loads 275 and an associated amount of time to determine if/when the elevator car 103 can be sent in view of a charge state or health status of the energy storage device 270. Health status can include monitoring a recharging and discharging capability of the energy storage device 270 for rates, charge levels, and/or other parameters. Further, interactions between the dispatching system 280 and power management system 230 can include requesting an adjustment to change a charge schedule of the energy storage device 270. For instance, where the elevator car 103 is expected to remain at one or more of the locations A1, A2 of the electrical power transmitters 240, a duty cycle at the electrical power transmitters 240 can be adjusted to use a lower power setting for charging the energy storage device 270 over a longer period of time. Where the elevator car 103 is planned to remain at one or more of the locations A1, A2 of the electrical power transmitters 240 for a shorter period of time, the duty cycle at the electrical power transmitters 240 can be adjusted to use a higher power setting for charging the energy storage device 270 over a shorter period of time. Further, the charging schedule and the dispatch schedule can be adjusted relative to other instances of the elevator system 101, as further described in reference to FIG. 4.

Referring now to FIG. 3, with continued reference to FIGS. 1-2, a block diagram illustrates communication between the power management system 230 and energy storage device management system 260. It should be appreciated that, although particular systems are separately defined in the schematic block diagrams, each or any of the systems may be otherwise combined or separated via hardware and/or software.

The power management system 230 can include, for example, an antenna 410, a transceiver 420, a processor 430, and a memory 440. The transceiver 420 is capable of transmitting and receiving data to and/or from the energy storage device management system 260 (e.g., including one-way and/or two-way communication). The transceiver 420 may, for instance, be a near field communication (NFC), Bluetooth, infrared, ZigBee, ZWave, laser, infrared, or Wi-Fi transceiver, or another appropriate wireless transceiver. The antenna 410 can be any antenna appropriate to the transceiver 420. The processor 430 and memory 440 are, respectively, data processing, and storage devices. The memory 440 may be RAM, EEPROM, or other storage medium where the processor 430 can read and write data 450.

The energy storage device management system 260 can include an antenna 310, a transceiver 320, a processor 330, and a memory 340. The transceiver 320 is capable of transmitting and/or receiving data to and from the power management system 230 (e.g., including one-way and/or two-way communication). The transceiver 320 may, for instance, be a near field communication (NFC), Bluetooth, infrared, ZigBee, ZWave, laser, infrared, or Wi-Fi transceiver, or another appropriate wireless transceiver. The antenna 310 can be any antenna appropriate to the transceiver 320. The processor 330 and memory 340 are, respectively, data processing, and storage devices. The memory 340 may be RAM, EEPROM, or other storage medium where the processor 330 can read and write data 450.

The energy storage device management system 260 may transmit data 450 to the power management system 230 in an open or closed feedback loop. The data 450 may be transmitted periodically, intermittently, or in real time. The power management system 230 may adjust the transmission of electrical power from the electrical power transmitter 240 to the electrical power receiver 250 in response to the data 450. The data 450 may include performance and operation status of the elevator car 103 and the energy storage device 270 including but not limited to the state of charge of the energy storage device 270, a state of health of the energy storage device 270, a temperature of the energy storage device 270, dispatching of the elevator car 103, a location of the elevator car 103, and a location of the electrical power receiver 250 relative to the electrical power transmitter 240. The power management system 230 may adjust the power and voltage of electricity being induced through the coils of the electrical power transmitter 240 in response to the data 450. In one example, the power management system 230 may only induce an electrical current through the coils of the electrical power transmitter 240 when the electrical power receiver 250 is within a transmission range of the electrical power transmitter 240. In another example, the power management system 230 may increase the electrical current through the coils of the electrical power transmitter 240 when the energy storage device 270 is low on electrical power or otherwise scheduled for recharging.

Figure 4:
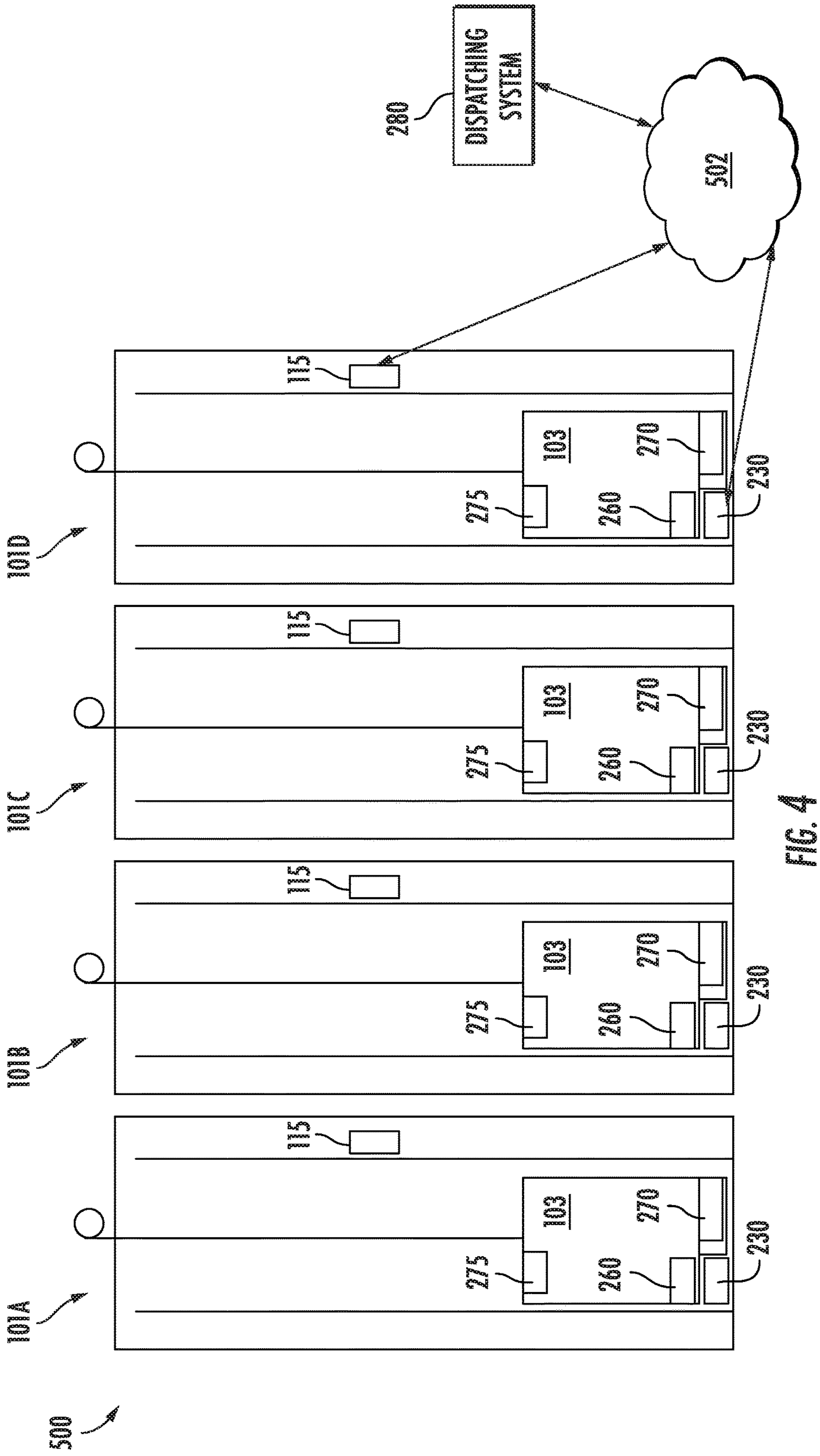
FIG. 4 is a schematic illustration of a power transfer system for multiple instances of the elevator system of FIG. 1, in accordance with an embodiment of the disclosure.

Turning now to FIG. 4, a system 500 includes multiple instances of the elevator system 101 of FIGS. 1 and 2, such as elevator system 101A, 101B, 101C, 101D as another example embodiment. Each of the elevator systems 101A-101D can include the elevator car 103, controller 115, power management system 230, energy storage device management system 260, energy storage device 270, and one or more electrical loads 275. In the example of FIG. 4, the energy storage device 270 is mounted below the elevator car 103. To balance electrical power demand and charging time requirements, the charging schedule used by each power management system 230 can be adjusted to change a charging duty cycle of the energy storage device 270 with respect to one or more other energy storage devices 270. For instance, dispatching system 280 can observe and track energy storage device 270 conditions to schedule charging times for each of the elevator systems 101A-101D. As one of the energy storage devices 270 has a charge level that drops below a minimum threshold, e.g., 50% charge, the dispatching system 280 can adjust the dispatch schedule to provide an extended charging period. For example, if the energy storage device 270 of elevator system 101A drops below a recharge threshold, the elevator system 101A may be taken offline or provided with a limited range of dispatch assignments (e.g., within several floors from a nearest recharging interface) while remaining elevator systems 101B-101D share a greater dispatch load.

By staggering the charging intervals of the elevator systems 101A-101D, transportation capacity can be maintained and charging power demands can be substantially normalized for the system 500. Further, if the energy storage devices 270 need to be charged for more than one of the elevator systems 101A-101D and scheduling demand is low, parallel charging may be performed using a lower charging duty cycle over an extended period of time (e.g., overnight). During a period of greater activity, the charging schedule can be adjusted to increase a charging rate. In embodiments, the charging schedule and the dispatch schedule can be adjusted with respect to one or more expected usage patterns of the elevator cars 103 of elevator systems 101A-101D. Expected usage patterns can be established by observing and tracking usage history or populated/augmented by an administrator.

Further, as depicted in the example of FIG. 4, the dispatching system 280 may be connected through a network 502 that can be in close proximity or remote from the elevator systems 101A-101D. As one example, the network 502 can be a cloud computing environment, where the dispatching system 280 is remotely located or distributed between multiple computer systems. Although the dispatching system 280 is depicted separately from the power management systems 230, the systems 230, 280 can be combined or further subdivided.

Figure 5:
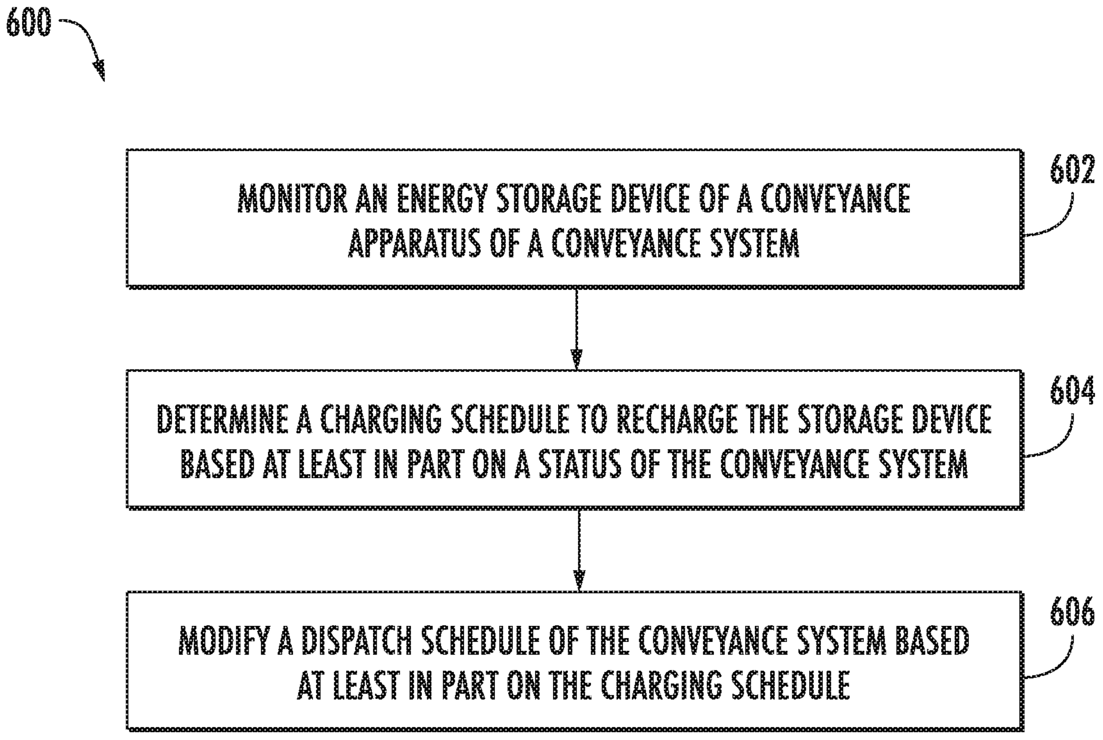
FIG. 5 is a flow chart of a method in accordance with an embodiment of the disclosure.

Referring now to FIG. 5, while referencing FIGS. 1-4, FIG. 5 shows a flow chart of a method 600 in accordance with an embodiment of the disclosure. The method 600 can be implemented on a variety of systems, such as system 200 of FIG. 2, system 500 of FIG. 4, and/or other system variations (not depicted). Further, the steps of method 600 can be further subdivided, combined, or re-ordered in embodiments.

At block 602, an energy storage device 270 of a conveyance system 101 can be monitored by a power management system 230. The power management system 230 can be configured to wirelessly transmit electrical power to the energy storage device 270 at one or more locations A1, A2. At block 604, the power management system 230 can determine a charging schedule to recharge the energy storage device 270 based at least in part on a status of the conveyance system 101.

At block 606, a dispatch schedule of the conveyance system 101 can be modified based at least in part on the charging schedule. The modification can be performed by the dispatching system 280. Modifying the dispatch schedule can adjust one or more of: a charging time of the energy storage device 270, an arrival time of the conveyance apparatus 103, and a departure time of the conveyance apparatus 103. Modifying the dispatch schedule may be based on at least one of: a state of charge of the energy storage device 270, a state of health of the energy storage device 270, a temperature of the energy storage device 270, a current dispatching plan of the conveyance apparatus 103, a location of the conveyance apparatus 103, and a location of a recharging interface.

Embodiments can adjust the charging schedule to change a charging duty cycle of the energy storage device 270 with respect to one or more other energy storage devices 270. The charging schedule and the dispatch schedule can be adjusted with respect to one or more expected usage patterns of a plurality of conveyance apparatuses 103 including the one or more other energy storage devices 270.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system comprising:

an energy storage device configured to provide electrical power to a conveyance apparatus of a conveyance system;

a power management system configured to determine a charging schedule to recharge the energy storage device based at least in part on a status of the conveyance system; and a dispatching system configured to modify a dispatch schedule of the conveyance system based at least in part on the charging schedule.

2. The system of claim 1, wherein modification of the dispatch schedule adjusts one or more of: a charging time of the energy storage device, an arrival time of the conveyance apparatus, and a departure time of the conveyance apparatus.

3. The system of claim 2, wherein modification of the dispatch schedule is based on at least one of: a state of charge of the energy storage device, a state of health of the energy storage device, a temperature of the energy storage device, a current dispatching plan of the conveyance apparatus, a location of the conveyance apparatus, and a location of a recharging interface.

4. A system comprising:

an energy storage device configured to provide electrical power to a conveyance apparatus of a conveyance system;

a power management system configured to determine a charging schedule to recharge the energy storage device based at least in part on a status of the conveyance system; and a dispatching system configured to modify a dispatch schedule of the conveyance system based at least in part on the charging schedule, wherein modification of the dispatch schedule adjusts one or more of: a charging time of the energy storage device, an arrival time of the conveyance apparatus, and a departure time of the conveyance apparatus, and the charging schedule is adjusted to change a charging duty cycle of the energy storage device with respect to one or more other energy storage devices.

5. The system of claim 4, wherein the charging schedule and the dispatch schedule are adjusted with respect to one or more expected usage patterns of a plurality of conveyance apparatuses comprising the one or more other energy storage devices.

6. The system of claim 1, wherein the power management system is configured to wirelessly transmit electrical power to the energy storage device at one or more locations.

7. The system of claim 1, wherein the conveyance system is an elevator system, and the conveyance apparatus is an elevator car.

8. The system of claim 1, wherein the energy storage device is a battery system.

9. The system of claim 1, wherein the energy storage device comprises one or more of: fuel cells, flow batteries, capacitors, and/or potential energy storage devices.

10. The system of claim 1, wherein the electrical power is provided to one or more of lights, heating, air conditioning, displays, panels, door motors, communication systems, sensor systems, and/or safety systems of the conveyance apparatus.

11. A method comprising:

monitoring, by a power management system, an energy storage device of a conveyance apparatus of a conveyance system;

determining, by the power management system, a charging schedule to recharge the energy storage device based at least in part on a status of the conveyance system; and modifying a dispatch schedule of the conveyance system based at least in part on the charging schedule.

12. The method of claim 11, wherein modifying the dispatch schedule adjusts one or more of: a charging time of the energy storage device, an arrival time of the conveyance apparatus, and a departure time of the conveyance apparatus.

13. The method of claim 12, wherein modifying the dispatch schedule is based on at least one of: a state of charge of the energy storage device, a state of health of the energy storage device, a temperature of the energy storage device, a current dispatching plan of the conveyance apparatus, a location of the conveyance apparatus, and a location of a recharging interface.

14. The method of claim 12, further comprising:

adjusting the charging schedule to change a charging duty cycle of the energy storage device with respect to one or more other energy storage devices.

15. The method of claim 14, wherein the charging schedule and the dispatch schedule are adjusted with respect to one or more expected usage patterns of a plurality of conveyance apparatuses comprising the one or more other energy storage devices.

16. The method of claim 11, wherein the power management system is configured to wirelessly transmit electrical power to the energy storage device at one or more locations.

17. The method of claim 11, wherein the conveyance system is an elevator system, and the conveyance apparatus is an elevator car.

18. The method of claim 11, wherein the energy storage device is a battery system.

19. The method of claim 11, wherein the energy storage device comprises one or more of: fuel cells, flow batteries, capacitors, and/or potential energy storage devices.

20. The method of claim 11, wherein the electrical power is provided to one or more of lights, heating, air conditioning, displays, panels, door motors, communication systems, sensor systems, and/or safety systems of the conveyance apparatus.

* * * * *